United States Patent [19]

Moll et al.

[11] Patent Number: 5,679,122
[45] Date of Patent: Oct. 21, 1997

[54] FILTER FOR THE FILTRATION OF A FLUID FLOW

[75] Inventors: Karl-Andreas Moll, Kaarst; Johannes Josef Meyers, Korschenbroich, both of Germany; Nicolaas Berend Westerhof, Rotterdam, Netherlands

[73] Assignee: Minnesota Mining & Manufacturing Company, St. Paul, Minn.

[21] Appl. No.: 596,160

[22] PCT Filed: Jun. 30, 1994

[86] PCT No.: PCT/US94/07388

§ 371 Date: Feb. 14, 1996

§ 102(e) Date: Feb. 14, 1996

[87] PCT Pub. No.: WO95/05235

PCT Pub. Date: Feb. 23, 1995

[30] Foreign Application Priority Data

Aug. 14, 1993 [DE] Germany ............... 43 27 368.8

[51] Int. Cl.$^6$ ..................... B01D 46/10; B01D 46/52
[52] U.S. Cl. ................. 55/497; 55/502; 55/511; 55/521; 55/DIG. 39; 210/493.3; 210/493.5
[58] Field of Search ................... 55/357, 385.3, 55/422, 497–499, 500, 502, 506–509, 511, 521, DIG. 39; 210/493.1, 493.3, 493.5

[56] References Cited

U.S. PATENT DOCUMENTS

| | | | |
|---|---|---|---|
| 1,890,499 | 12/1932 | Davies | 55/497 |
| 2,203,570 | 6/1940 | Hollebone | 55/500 X |
| 2,457,958 | 1/1949 | Walker | 210/493.1 |
| 3,058,594 | 6/1962 | Hultgren | 210/493 |
| 3,144,315 | 8/1964 | Hunn | 55/500 X |
| 3,273,327 | 9/1966 | Hoffman | 55/507 |
| 3,487,610 | 1/1970 | Brown et al. | 55/DIG. 39 |
| 3,520,417 | 7/1970 | Durr et al. | 210/493 |
| 3,747,772 | 7/1973 | Brown | 55/521 X |
| 3,793,813 | 2/1974 | McAllister | 55/521 X |
| 4,236,901 | 12/1980 | Kato et al. | 55/497 X |
| 4,462,399 | 7/1984 | Braun | 55/497 X |
| 4,615,804 | 10/1986 | Wright | 210/493.1 |
| 4,640,698 | 2/1987 | Ohishi et al. | 55/502 |
| 4,861,359 | 8/1989 | Tettman | 55/502 X |
| 5,391,112 | 2/1995 | Wardlaw | 55/500 X |
| 5,501,794 | 3/1996 | Van de Graaf et al. | 55/497 X |
| 5,509,950 | 4/1996 | Van de Graaf et al. | 55/497 X |
| 5,531,892 | 7/1996 | Duffy | 55/497 X |
| 5,554,205 | 9/1996 | Ernst et al. | 55/385.3 |

FOREIGN PATENT DOCUMENTS

| | | | |
|---|---|---|---|
| 0651677 | 11/1962 | Canada | 55/511 |
| 0 170 643 | 2/1986 | European Pat. Off. | |
| 0 438 639 | 1/1990 | European Pat. Off. | |
| 0 380 026 | 8/1990 | European Pat. Off. | |
| 0 441 045 | 8/1991 | European Pat. Off. | |

(List continued on next page.)

OTHER PUBLICATIONS

PCT International Search Report.

*Primary Examiner*—Robert Spitzer
*Attorney, Agent, or Firm*—Gary L. Griswold; Walter N. Kirn; William J. Bond

[57] ABSTRACT

The flexible filter element (12) of the filter (10) is pleated in a zig-zag-shaped configuration and has its longitudinal edges (24) connected to support elements (26). Each of the support elements (26) comprises a plurality of support members (40) arranged beside one another and being interconnected by a continuous flange (28). The support elements (26) as well as the rest of the filter element (12) are made of a plastic material. The strength of the flanges (28) is selected in such a manner that the support members (40) are flexible relative to each other which is possible by elastic or plastic deformation of the support elements (26) in the region of the flanges (28), particularly in that region of the flanges (28) wherein these flanges connect adjacent support members (40). The filter (10) can be produced as a filter element (12) extending in a linear plane, which, because of its flexibility, can be deformed while being mounted and/or remain deformed in its mounted condition.

16 Claims, 4 Drawing Sheets

FOREIGN PATENT DOCUMENTS

| | | | |
|---|---|---|---|
| 3622955 | 1/1988 | Germany | 55/521 |
| 88 08 632 | 9/1988 | Germany. | |
| 37 09 827 | 10/1988 | Germany. | |
| 3834942 | 10/1988 | Germany. | |
| 39 36 838 | 5/1991 | Germany. | |
| 53-035267 | 4/1978 | Japan | 55/521 |
| 1570385 | 7/1980 | United Kingdom. | |
| WO 92/09309 | 6/1992 | WIPO. | |
| WO 92/09311 | 6/1992 | WIPO. | |
| WO 93/12858 | 7/1993 | WIPO. | |

FILTER FOR THE FILTRATION OF A FLUID FLOW

BACKGROUND AND FILTER OF THE INVENTION

The invention is directed to a filter for the filtration of a fluid flow, particularly a filter for the filtration of a fluid flow to be introduced into the passenger cabin of a motor vehicle.

Filters for the filtration of a fluid flow, particularly for the filtration of an air flow, are known in a wide variety of embodiments. Since the filtering efficiency of filter or filter elements largely depends on the size of the filter surface exposed to the flow, frequently used are zig-zag-shaped pleated filter elements. In this case, the filter element itself comprises a filter paper or a filtering non-woven supported on a likewise zig-zag-shaped pleated support structure arranged therebelow.

Filters with pleated filter elements are known from GB-PS 1 570 385 and EP-A-0 438 639. In these known filters, the zig-zag-shaped pleated filter element is surrounded by a rigid rectangular frame, with the linear frame portions extending in a common plane. From DE-A-38 34 942, a filter device is known wherein the filter element consists of a plurality of filter blocks interconnected by flexible bands. Each of the filter blocks comprises a pleated, multi-part filter element surrounded by a rigid frame. The frames of these filter elements are connected to each other by the flexible bands.

Besides the above described substantially flat filter elements, there are also known round filters wherein the zig-zag-shaped pleated filter element is arranged in an annular configuration. Such round or ring-shaped filters are described in U.S. Pat. No. 3,058,594, U.S. Pat. No. 3,520,417, U.S. Pat. No. 4,615,804 and EP-A-0 441 045. Ends of these round or ring-shaped filter elements which are facing each other in their axial direction are provided with disk-shaped covers connected to the filter element.

Particularly in the field of motor vehicles, narrow space limitations can make it necessary that a zig-zag-shaped filter element is received by the filter frame in a bent condition. On the other hand, a bent or otherwise deformed orientation of a zig-zag-shaped filter element can also be suggested for flow reasons and thus be advantageous. The production of a bent filter element is relatively complicated. Further, the mounting of curved filter elements can cause problems due to restricted space conditions.

From EP-A-0 380 026, there is known a flexible flat filter element which is adapted for insertion into curved guide grooves of a filter frame. However, in the filter surface offered by a flat filter element is not sufficient in filter capacity so that this known filter element is useful only in a limited range of applications. In all cases where high filter capacities are required in relatively small flow cross sections, zig-zag-shaped pleated filter elements should be used.

DE-A-41 43 237 (corresponding to PCT/US 92/09 309) discloses a flexible zig-zag-shaped filter element. This known filter element, on its edges extending transverse to the curved bending regions and the flat folding regions, is provided with flexible bands which, on the longitudinal edges or longitudinal sides of the filter element which are oriented in the folding direction, are tightly connected to the filter element. The filter element according to DE-A-41 43 237 can be stored in compacted form because the flexible bands make it possible to compress the zig-zag-shaped filter element and to store it in this condition. However, this filter element is to be inserted into rigid filter frames as described in PCT-US 92/09 311.

Finally, EP-A-0 170 643 discloses a filter wherein the zig-zag-shaped pleated filter element is held in position by having its edges clamped tight between an upper and a lower frame element. On the longitudinal frame portions extending in the direction of the longitudinal edges of the filter element, the two frame elements are provided with mutually complementary, substantially triangular projections which are in engagement with each other and hold the filter element between them. However, also this two-part filter frame, which is not bonded to the filter element, is rigid.

It is an object of the invention to provide an efficient filter for the filtration of a fluid flow, particularly for the filtration of a fluid flow to be introduced into the passenger cabin of a motor vehicle, wherein the filter element, being produced in an easy manner and at low cost, is bendable during mounting and/or is arranged in a bent condition after having been mounted.

For solving the above object, the filter proposed according to the invention comprises:

— a filter element having longitudinal edges and comprising a filter material layer with a filter surface exposed to the fluid flow, wherein the filter material layer is pleated for enlarging the filter surface such that the filter element has a three-dimensional structure with plane folding portions and-curved bending portions, said longitudinal edges of the filter element extending transversely to said folding portions and bending portions, and — two filter element support elements abutting the longitudinal edges of the filter element and comprising individual interconnected support members at least one filter element support element having adjacent mutually confronting limiting edges, said support elements for supporting said three-dimensional structure of the filter element.

— the filter element has its longitudinal edges connected to the filter element support elements and the support members, and — the at least one filter element support element is arranged for flexural deformation between its individual support members.

The solution proposed by the invention is to be seen particularly in that a pleated filter element, arranged in a plane, is provided with filter element support elements for supporting and maintaining the structure of the filter element, said filter element support elements being connected to the filter element on the longitudinal edges thereof, and that at least one of the filter element support elements is bendable or deformable. The pleated filter element arranged in a plane can be produced in a continuous process in a relatively simple manner; also the connection of the filter element longitudinal edges to the filter element support elements can be effected in a relatively inexpensive manner. Since at least one of the support elements is provided to be bendable or deformable at least in some regions, it becomes possible to deform the filter element during mounting. Irrespective of the deformability while mounting the filter element into a filter system, the inventive filter element, when having attained its mounted condition, can be oriented again in linear fashion or be deformed or twisted in some other manner.

The filter element of the invention filter has its longitudinal edges bonded to the support elements. The filter element support elements comprise a plurality of support members which contribute to the maintaining the three-dimensional zig-zag structure of the filter element. At least one of the filter element support elements, and preferably both of the filter element support elements, are provided to be flexible between the support members. The term "flexible" in this context means that the support members of the filter element support element can be articulated relative to each other or are movable relative to each other under plastic or flexural deformation of the support element. The support members themselves should be comparatively resistant to bending so that the pleat protrusions of the filter element generated by the zig-zag pleating will maintain their shape even when the filter element is deformed or bent out of configuration.

In principle, it is not required that each zig-zag pleat has a support member on both sides of the filter element. However such an arrangement is preferred so that the longitudinal edges of the filter element in the region of two plane folding portions are connected to support members laterally of the curved bending portion arranged between these folding portions.

By providing that all of the support members are connected to each other by the support elements assigned to them, the zig-zag pleating of the filter elements is maintained, irrespective of the position and orientation of the filter element.

Generally, the support members of a support element can be arranged closely adjacent each other, their limiting edges parallel to each other. In a filter element provided with support elements and support members, deformation or deflection of the filter element would be possible only with simultaneous increase or decrease of the distance of adjacent support members limiting edges.

Preferably, the support members are triangular or trapezoidal.

Irrespective of the shape and configuration of the support members, the "valleys" of the zig-zag-shaped filter element are located between two adjacent support members, while the filter element support elements in their regions between adjacent support members do not project above the valleys of the filter element. In other words, when seen in longitudinal direction, the filter element support elements are interrupted, i.e. not continuous, in the region between their support members but are continuous below the base of the support members. Thus, as it were, the support elements are "toothed", with the "teeth" being formed by the support members. Such a structure of the filter element makes it possible that, when the filter element is inclined to a suitable extent, liquid which has accumulated on the surface of the filter element can be drained off along the valleys and between the support elements. This drainage of liquid adhering to the filter element is desired, e.g., when using the inventive filter in an off-road vehicle. A preferred manner of providing for the flexibility of adjacent support members consists in giving the respective filter element support element such a small thickness in the regions between adjacent support members that the filter element support element is deformable, preferably elastically, with simultaneous change of the distance between the limiting edges of adjacent support members. In the above configuration it is further advantageous to provide the support elements with small flanges which laterally project beyond the longitudinal edges of the filter element and which face away from each other. These flanges can be received in guide grooves or guide means adapted for insertion of the filter and for holding the filter on its lateral edges in the mounted condition.

For increasing the mechanical stability of the filter element according to an advantageous embodiment of the invention support elements are provided, on two ends arranged in opposite pairs, which are interconnected by connecting portions extending along the transverse edges of the filter element, i.e. in parallel to the bending regions of the filter element. Thus, the two filter element support elements and the two connecting portions extending transversely thereto constitute a filter element support frame surrounding the filter element on all sides. Preferably, the transverse edges of the filter element are connected to the connecting portions, i.e. the transverse edges of the filter element support frame.

Generally, in the filter of the invention, any suitable type of filtration material can be used. Thus, for instance, the filter element can be made of zig-zag-shaped folded filter paper. It is preferred that the filter element has electret properties. For this purpose, it is provided that the filter material comprises a one- or more non-woven filtering layers wherein the individual nonwoven filter layer fibers have electret properties; in this case, a coarsely perforated reticular support structure should be provided for supporting the non-woven filtering layer.

For the filter element support elements and, if provided, for the connecting portions of the filter element support frame, any suitable flexible material or, put more precisely, any plastically or elastically deformable material can be used. Preferably, plastic material is used, especially polypropylene. For providing that the inventive filter is better suited for recycling the filter element itself consists of the same material as the support elements or support members and, if provided, the whole filter element support frame. When using a one or more non-woven-filtering layers, arranged on a reticular support structure, the reticular support structure as well as the fibers of the non-woven layer are made from polypropylene.

Each of the filter element support elements or, if provided, the filter element support frame, is manufactured by injection molding as a one-pieced injection-molded body. The connection of the support elements or the support members with the longitudinal edges of the three-dimensional filter elements is preferably effected by injection-molding the material used for the filter element support elements or for their support members around and onto the longitudinal edges of the filter element. In this manner the transverse edges of the filter element can be connected to connecting portions of the filter element support frame. Such a molding is performed in a so-called insert injection molding process wherein the piece to be enclosed by molding—in this case the zig-zag-shaped pleated filter element—is inserted into the injection mold, while the edges of the piece which are to be enclosed by molding are exposed. The result of this manufacturing process is that the longitudinal edges of the filter element are enclosed by the material of the support elements and after the solidification of the material of the support element, are "meshed" with the support elements. The above applies also for the connection of the transverse edges of the filter element to the connecting portions of the filter element support frame which extend parallel to these transverse edges and connect the support elements to each other.

Of course, the connection of the filter element to the support elements and, if provided, to the connecting portions, can also be performed in any other suitable manner. However, this connection should be such that it will not become detached even when the filter is being bent. Alternatively, the filter element can be connected to the support elements or their support members by ultrasonic welding.

If required, a soft, elastic seal can be provided on the outer sides of the filter element support elements. If the support elements are provided with flat, thin, laterally projecting flanges, the flange seal is preferably at an angle of substantially 90° between the upper side of the flange and the outer sides of the support members.

Even though it may be somewhat bothersome from the viewpoint of the assembly process, a highly reliable connection is provided when the longitudinal edges of the filter element, having zig-zag shape when viewing the filter element from the side, are received in receiving grooves formed in the support members and the remaining region of the support elements.

When the filter element is provided with a reticular support structure or—put in more general terms—with a support material layer carrying a filtering non-woven layer thereon, the arrangement of the filter in the fluid flow to be filtered is such that the fluid impinges onto the non-woven filtering layer. For maintaining the fluid flow, use is made of suitable means provided for this purpose, e.g., a fan or the like which in this case blows air through the filter element. In the context of the instant invention, the term "means" is to be understood in a very general sense in so far as it is meant to denote all devices and circumstances which provide for a (fluid) flow passing through the filter element or the filter. After all a vehicle provided with the inventive filter can be considered as such a means since the movement of the vehicle will cause an air stream to pass through the filter.

BRIEF DESCRIPTION OF THE DRAWINGS

Embodiments of the invention will be explained in greater detail hereunder with reference to the accompanying drawings.

DETAILED DESCRIPTION OF THE INVENTION

Figure 1:
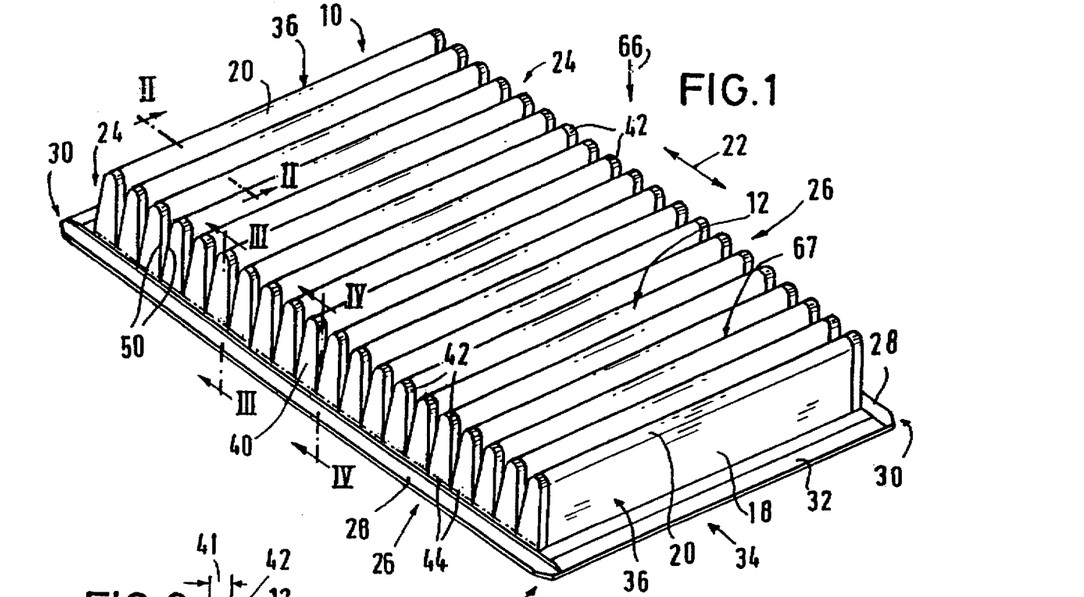
FIG. 1 is a perspective view of a filter with a zig-zag-shaped pleated filter element according to a first embodiment of the invention.
Figures 2, 3, 4:
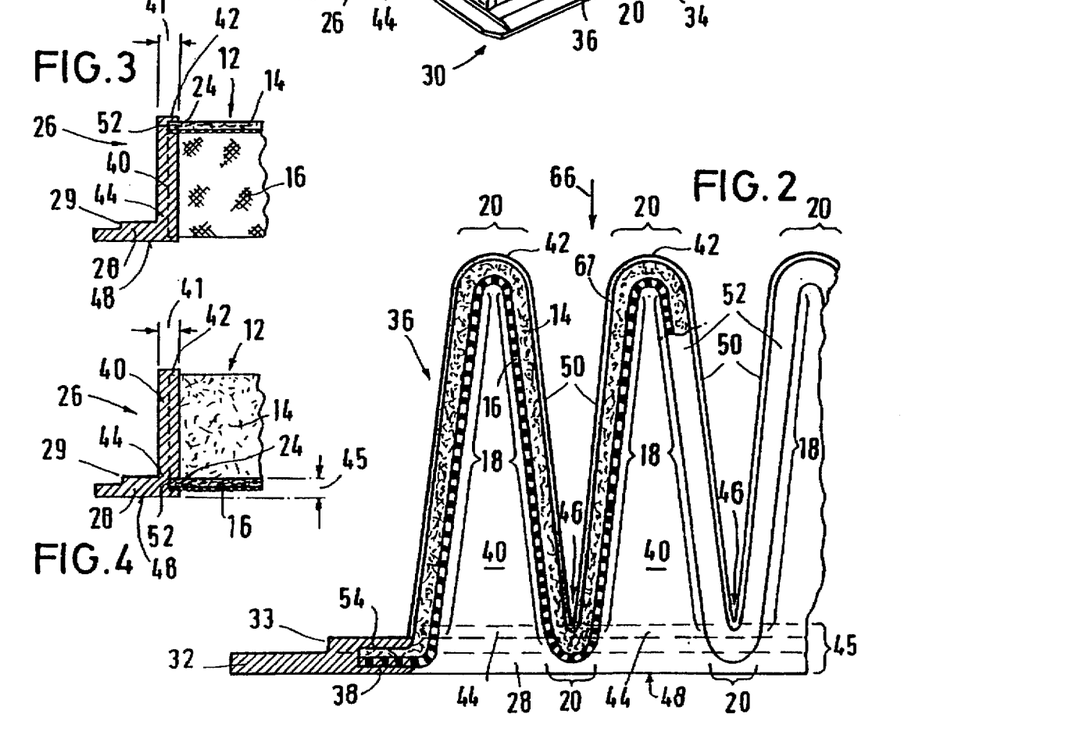
FIG. 2 is a longitudinal sectional view of the filter of FIG. 1 along the line II—II of FIG. 1.
FIG. 3 is a cross sectional view through one of the two longitudinal edges of the filter of FIG. 1 along the line III—III in FIG. 1.
FIG. 4 is a cross sectional view through one of the two longitudinal edges of the filter of FIG. 1 along the line IV—IV in FIG. 1.

FIG. 1 shows a perspective view of a filter 10 made from polypropylene and provided with a zig-zag-shaped pleated filter element 12. The filter element 12 is arranged in two layers and comprises a non-woven filtering layer 14 with electret properties, which is arranged on a reticular support structure 16 and is supported thereon (cf. FIG. 2). The fibers of the non-woven filtering layer 14 and the coarsely perforated reticular support structure 16 are made from polypropylene. As can be seen in FIGS. 1 and 2, the filter element 12 is pleated in a zig-zag configuration in such a manner that it comprises plane folding portions 18, arranged in angular orientation relative to each other, and bending portions 20 connecting the folding portions 18. Respectively adjacent folding portions 18 extend at an acute angle relative to each other and are symmetrical to a plane which passes vertically through the zenithal line passing through the adjacent folding portions 18.

The filter element 12, pleated in a zig-zag shape as evident from FIG. 1 and having its folding direction 22 (cf. the arrow shown in FIG. 1) oriented in the longitudinal direction of the filter element 12, is provided with support elements 26 of a plastic material which are arranged on the two longitudinal edges or sides 24 of filter element 12. The support elements 26 are tightly connected to filter element 12 on its longitudinal edges 24. Each of the support elements 26 comprises a thin strip of a plastic material laterally projecting beyond the respective longitudinal edge 24 of filter element 12 and forming a flange 28. This flange 28 has its outer free edge formed in a stepped shape (as shown at 29 in FIGS. 3 and 4) and extends substantially at the level of the lower bending portions 20 forming the "valleys" of filter element 12 and reaches down to a level below the lower bending portions 20 (in this respect, cf. also FIGS. 2 to 4). Further, the longitudinal extension of the flanges 28 (cf. arrow 22 in FIG. 1) project beyond the ends of filter element 12. The ends 30 of the flanges 28 in the longitudinal extension of the filter element 12 are integrally connected to each other by transverse connecting portions 32. These connecting portions 32, likewise shaped as flanges and of a stepped shape as are flanges 28 (shown at 33 in FIG. 2), together with the support elements 26 form a continuous filter element support frame 34. The connecting portions 32 are connected to the ends 36 of filter element 12 arranged in the folding direction 22; this connection is provided on the transverse edges 38 of filter element 12 which are arranged in this connecting region (cf. also FIG. 2). The transverse edges 38 of filter element 12 are situated in the plane defined by the connecting portions 32 and the flanges 28 of the support elements 26. Accordingly, the ends 36 of filter element 12 arranged in the folding direction 22 have respective plane folding portions 18 arranged thereon which are connected to the connecting portions 32 and are joined by upper bending portions 20.

Support members 40, projecting upwardly from the flanges 28 of the two support elements 26, are integrally connected to the flanges 28. These support members 40, which in combination with the flanges 28 serve for maintaining the three-dimensional folding or zig-zag structure of filter element 12, are tightly connected to the longitudinal edges 24 of filter element 12. When viewing the filter element 12 from the side, the support members 40 have the shape of isosceles triangles with rounded upper ends 42. The support members 40 have only a slight thickness, i.e. their dimension in the direction of the bending portions 20 is small. On their base portions 44 facing away from the upper ends 42, the support members 40 of a support element 26 are integrally connected to each other and to the flange 28. The height of the base portions 44 is small and can even be negligible so that each of the support elements 26 can be considered as a succession of projecting support members 40 connected by a continuous flexible film whose strength is determined by the thickness of flange 28 and the height of the base portions 44. By a suitably thin shape of this film, i.e. by selection of a suitably small distance between the valleys 46 of adjacent support members 40 and the lower side of flange 28 (shown at 45 in FIGS. 2 and 4) and by selection of a plastic material allowing flexural or plastic deformation, e.g., polypropylene, is formed flexible support elements are formed.

The flexibility or the movable arrangement of support elements 26 in the region between adjacent support members 40 is sufficient for a deformation or bending of the support elements 26 so that flanges 28 do not extend linearly anymore, the deformation or bending taking place with an increase of the distance of confronting edges 50 of adjacent support members 40. To permit a bending of the support elements 26 with a decrease an the distance between the support members 40, i.e. with a decrease of the distance between the upper ends 42 of the support members 40, the support members 40 have an upward tapering shape. For example, the substantially triangular shapes of the support members 40 of the present embodiment. Therefore, it is possible to deform the filter element 12 both in the direction shown in FIGS. 5 and 6 and in the opposite direction according to FIG. 8 without changing the projecting pleat structures of the filter element 12, being triangular in cross section, which structures are maintained because of the connection of the longitudinal edges 24 to the support members 40.

As can be seen in FIGS. 2 to 4, the longitudinal edges 24 are received in receiving grooves 52 arranged on the confronting inner sides of the support members 40 and of the flanges 28 of the two confronting support elements 26, and in grooves 54 arranged on the confronting inner sides of the connecting portions 32. These grooves 52,54 are generated automatically when the filter element support frame 34 is produced in an injection molding process wherein the zig-zag-shaped filter element 12 is initially laid into the injection mold. During this molding process, the exposed longitudinal and transverse edges 24,38 of filter element 12 are surrounded by plastic of which the support frame 34 consists. Thus, as it were, the actual mold to be filled by injection of the plastic material is formed as a ring around the filter element 12. In this injection molding process, the support members 40, the flanges 28 and the connecting portions 32 are formed as one piece. As is further evident particularly from FIGS. 2 to 4, the support members 40 have their edges (legs 50 and upper end 42.) slightly projecting beyond filter element 12.

The filter element 12 as described above and illustrated in the Figures offers the following advantages:

—Because of the zig-zag structure of the filter element, the usable filter surface is enlarged, resulting in increased filter performance.

—Since the filter element is bendable, mounting is facilitated even under restricted space conditions since obstacles can be evaded by corresponding deformation of the filter element.

—The bendable filter element can be used in many applications which require an arrangement of the filter element in a curved, bent or some other deformed or twisted condition. In this regard, it is favorable that, prior to mounting, the filter element need not yet have the shape required in the mounted condition. The filter element, which in its mounted condition can sometimes take a bizarre shape, is manufactured as a zig-zag-shaped piece extending in linear configuration, and can subsequently be deformed due to its flexibility. The production of zig-zag-shaped filter elements substantially extending linearly in a plane, is considerably less complex and less expensive than the production of curved filter elements in conformity with specific shapes.

—Since the support members of the support elements, supporting the three-dimensional zig-zag structure of the filter element, are not continuous on the longitudinal edges of the filter element but, instead, have recesses formed therein in alignment with the valleys of the zig-zag-shaped filter element, an inclined orientation of the filter element in its mounted condition will make it possible to drain off liquid from the filter surface, particularly water, which has undesirably come in contact with the filter surface.

Figures 5, 6:
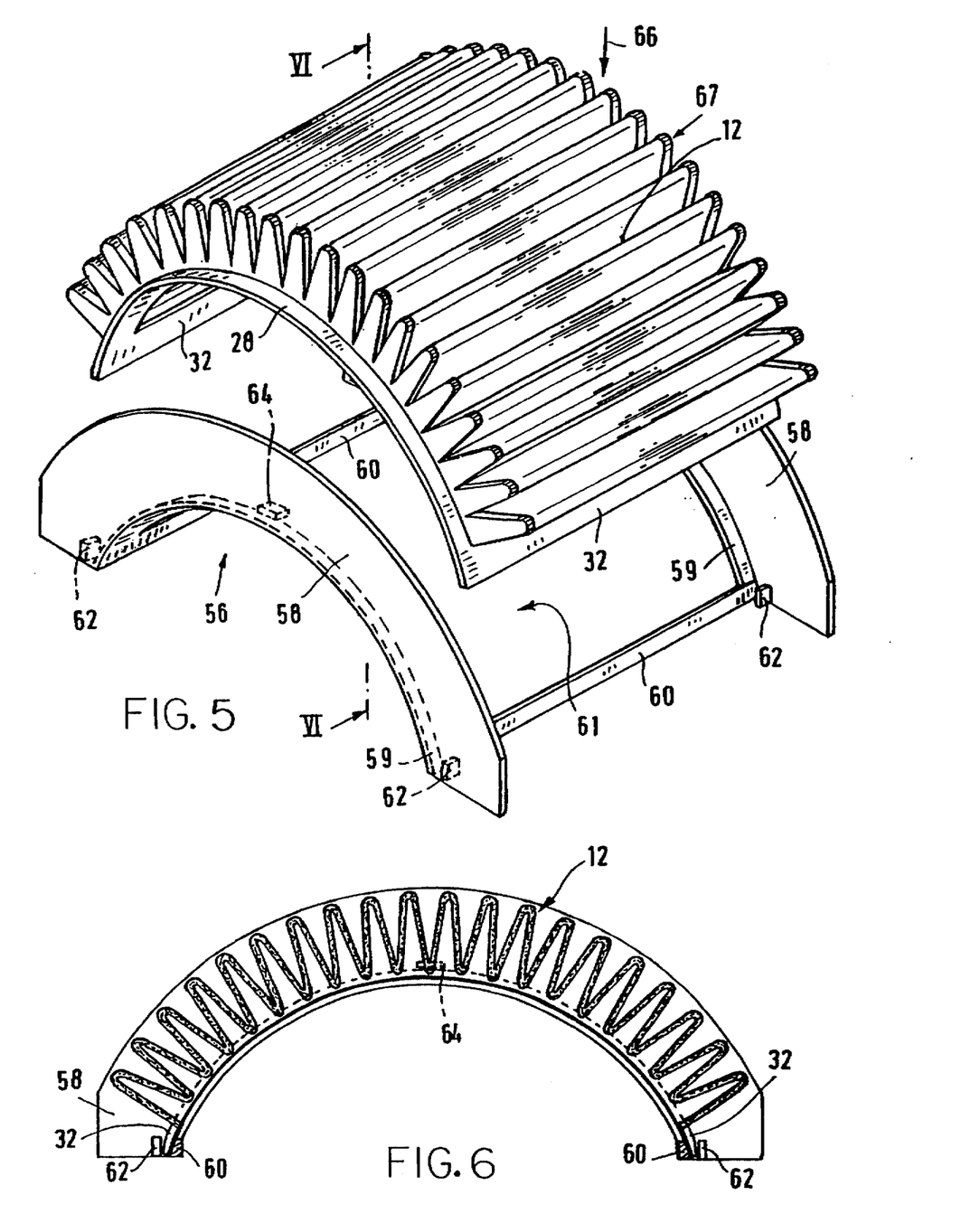
FIG. 5 is a perspective view of the filter of FIG. 1 in the mounted condition, with the filter being deformed and extending along a circular curve.
FIG. 6 is a longitudinal sectional view of the filter of FIG. 5 in the mounted condition.
Figure 7:
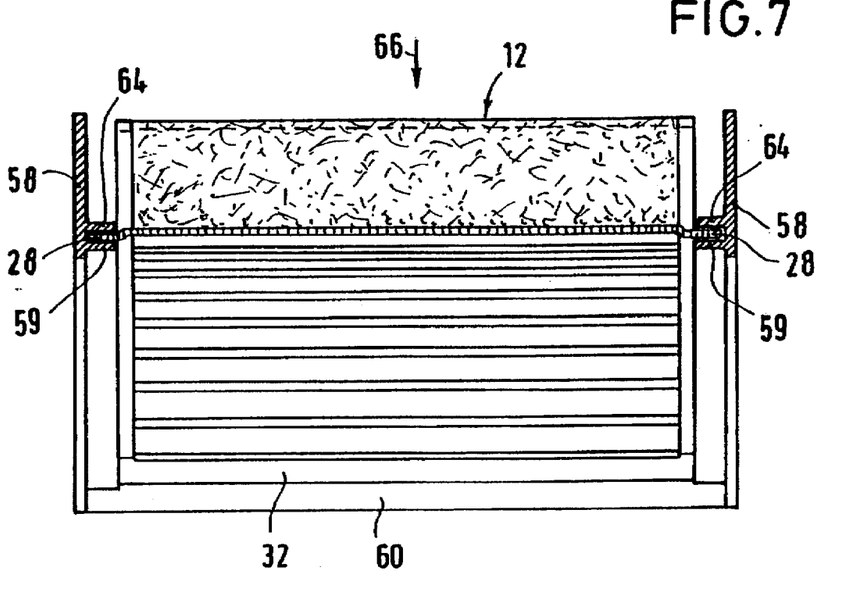
FIG. 7 is a sectional view along the line VII—VII in FIG. 5.

FIGS. 5 to 7 show a possible application of the filter element wherein the filter element is curved in the mounted condition. The elastically deformable filter element 12 is clampingly held in an arcuate insert frame 56 which in turn can be inserted into an air inlet opening, e.g., of an air conditioning system, or which itself forms and defines this air inlet opening. The insert frame 56 comprises two side frame portions 58 shaped as circular arcs while extending in parallel to the longitudinal edges 24 of the support elements 26 of the filter element 12. The side frame portions 58 are provided with inner flanges 59 and are connected to each other by transverse frame portions 60. The curved longitudinal frame portions 58 and the transverse frame portions 60 of the insert frame 56 surround an opening 61. On the confronting inner sides of the longitudinal frame portions 58, holding projections 62 and 64 are arranged. Between these holding projections 62 and 64 and the inner flanges 59 or the transverse frame portions 60, the filter element 12 is held by its two flanges 28 on the longitudinal edges 24 in that the holding projections 62,64 engage the flanges 28. The holding projections 62,64 formed as projecting lugs, are arranged on the two ends of each of the curved longitudinal frame portions 58, while the holding projections 64 are arranged exclusively in the apex region of the curved longitudinal frame portions 58. First, the flexible filter element 12 is guided with its flanges 28 into the confronting holding projections 64 and then, under deformation of filter element 12, its ends 36 are guided behind the holding projections 62. The holding projections 62 prevents the filter element, due to its elasticity, from taking on its (linearly) stretched condition again. The holding projections 64 also preclude undesired detachment of the filter element 12 from insert frame 56. In the mounted condition illustrated in FIGS. 5 to 7, the filter element 12 is curved with an accompanying enlargement of the distance between the upper ends 42 of the support members 40 of its support elements 26. The flow arrow 66 in the Figures (cf. particularly FIG. 1) points the direction in which the air flow to be filtered impinges onto the filter surface 67 of filter element 12.

Figure 8:
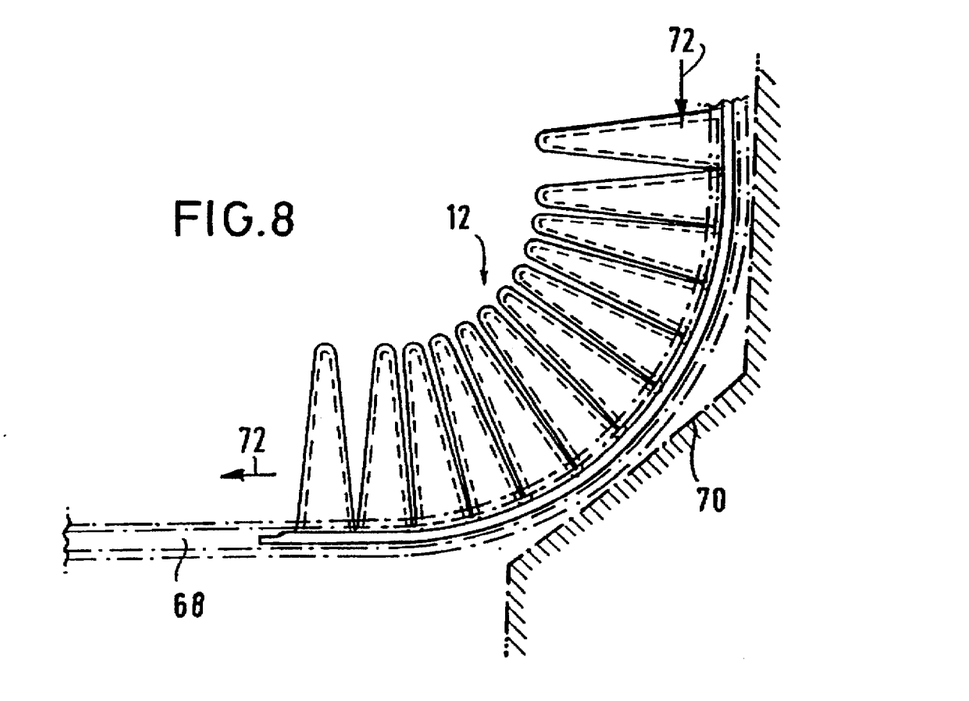
FIG. 8 is a view for illustrating the flexibility of the filter element of FIG. 1, e.g., during mounting and insertion into a filter element holding means.

FIG. 8, already mentioned above, schematically illustrates the filter element 12, e.g., mounted into a filter holding frame having guide means indicated at 68 in FIG. 8, deformed for evading, e.g., the obstacle indicated at 70. The direction of insertion of the filter element 12 into the guide means 68 of the filter holding frame (not shown) is indicated by arrows 72.

Figure 9:
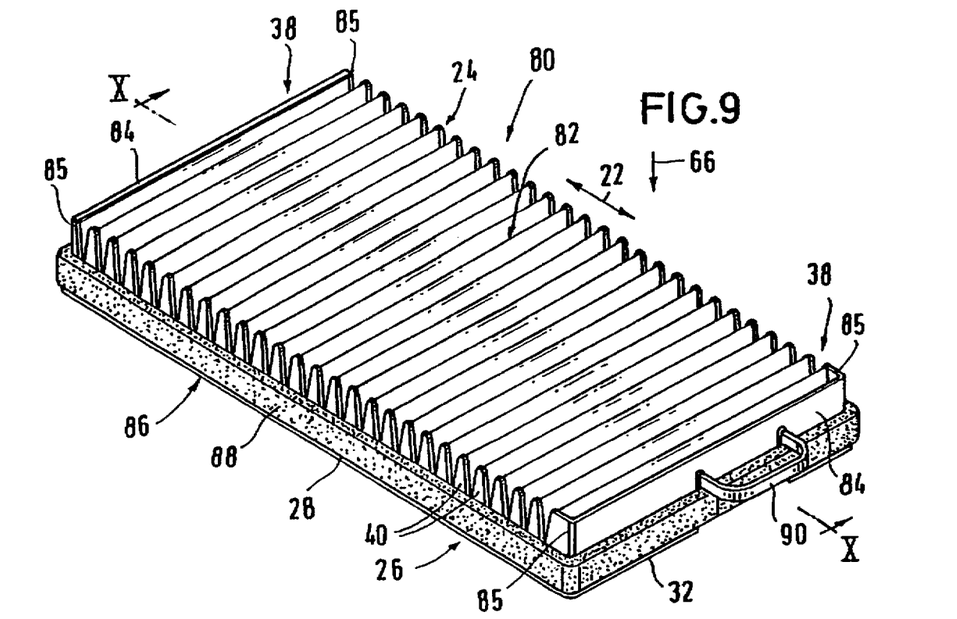
FIG. 9 is a perspective view of a filter with a zig-zag-shaped pleated filter element and a surrounding elastic sealing.
Figure 10:
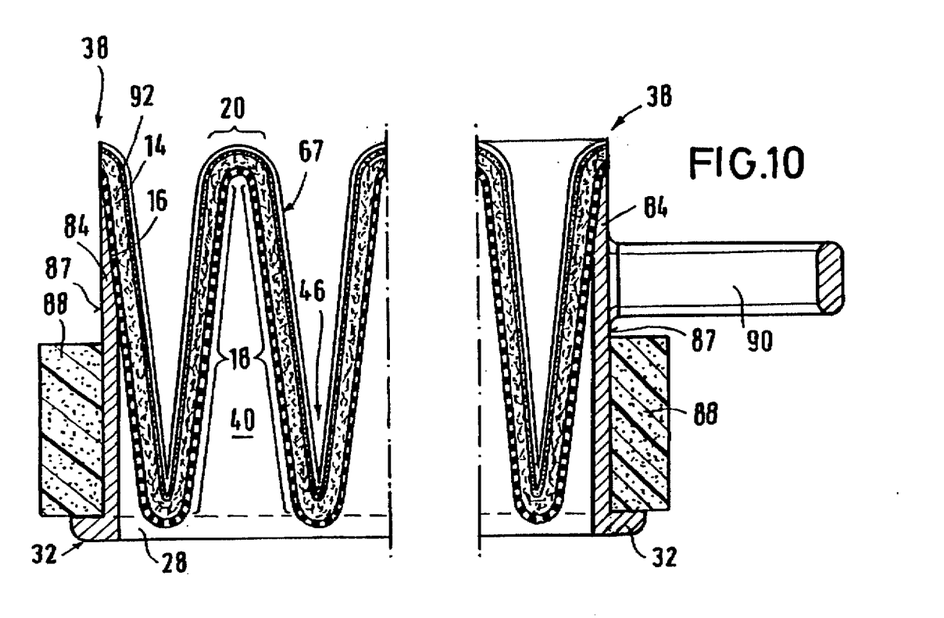
FIG. 10 is a sectional view along the line X—X in FIG. 9, at an enlarged scale.

FIGS. 9 and 10 show a second embodiment of a filter 80 comprising a zig-zag-shaped pleated filter element 82. In as far as the filter 80 and its filter element 82 are of a structure similar to that shown in FIGS. 1 to 8, the same reference numerals are used for the second embodiment in FIGS. 9 and 10. Other than filter 10, the filter 80 according to the second embodiment is provided with an upright edge 84 of plastic material on both of the transverse edges 38 of filter element 82. The height of the upright frame portions 84 is identical to the height of the support members 40 of the support elements 26 on the longitudinal edges 24 of filter element 82. The upright frame portions 84 are integrally connected to the flange-like connecting portions 32. In contrast to the configuration of filter element 12 of the first embodiment, the zig-zag-shaped pleated filter element 82 of filter 80 has its transverse edges 38 ending at the height of the upper bending portions 20 (cf. FIG. 10). For increasing stability, the upright frame portions 84 are provided with edges 85 pulled around the corners, which are connected to the filter element 82 and the ends of the support elements 26. Due to this arrangement, the upright frame portions 84 are, as it were, pulled around the edges of filter element 82.

The filter element support frame 86, which in the embodiment according to FIGS. 9 and 10 comprises the upright frame portions 84 and the support elements 26, is surrounded by a foamed plastic sealing 88 arranged on the outer side 87 of the filter element support frame 86. This sealing means 88 is provided for sealing the filter 80 against the edge of an opening into which filter 80 is inserted. For facilitating the handling of filter 80, one of the two upright frame portions 84 is provided with a handle 90 formed integrally therewith.

With regard to the connection of filter element 82 to the support elements 26, i.e. to their flanges 28 and support members 40, and to the frame portions 84, it is to be noted that this connection, as in the filter element 12 in FIGS. 1 to 7, is realized by molding the plastic material of the filter element support frame 86 around filter element 82. In addition to the non-woven filtering layer 14, the filter element 80 is provided with a further air-permeable non-woven layer 92 arranged as a cover layer on the non-woven filtering layer 14. This cover layer 92 safeguards that the fibers cannot become detached from the non-woven filtering layer 14 but instead are held on filter element 12 by the cover layer 92 which is connected to filter element 12 in a suitable manner.

EXAMPLES

A filter element 12 constructed according to the embodiment of FIGS. 1 to 7 was provided with a thermoplastic reticular support structure 16 of polypropylene. The reticular support structure 16 had substantially quadrangular openings formed therein, the edges of these openings having a length of about 3 mm. The thickness of the reticular support structure 16 was about 0.64 mm, and the width of the individual bars of support structure 16 between the openings was about 0.84 nun. The material used for the non-woven filtering layer 14 was an electret material, in this case a non-woven consisting of needle-tacked polypropylene fibers having an average fiber diameter of about 40–50 µm. In a manner known to the expert in the field, these fibers were given electret properties. The connection of the non-woven filtering layer 14 to the reticular support structure 16 was effected by bonding. The height of the filter element 12, i.e. the filter height, was about 20 mm; the flanges 28 had a size of about 2 mm on their thickest portions where they were attached by molding about the longitudinal edges 24 of the filter element 12, and the thickness of the support members 40 was about 2 mm. The flanges 28 had a width of about 12 mm, and the width of the connecting portions 32 was about 10 mm.

The overall dimensions of the flexible rectangular filter element 12 were about 20,5 cm ×19,5 cm. This filter element 12 was bendable by application of a bending force well under 10N. (Forces between 2 and 5N were detected.)

In addition to the above mentioned specifications, a filter 80 constructed according to the embodiment of FIGS. 9 and 10 was provided with a cover layer 92 comprising a non-woven fiber layer of thermally interconnected polypropylene fibers with an average fiber diameter of about 40–50 µm. The connection between the cover layer 92 and the non-woven filtering layer 14 was effected by bonding.

We claim:

1. A filter for the filtration of a fluid flow, comprising:

a filter element having longitudinal edges and comprising a filter material layer with a filter surface exposed to the fluid flow, wherein the filter material layer is pleated for enlarging the filter surface such that the filter element has a three-dimensional structure with plane folding portions and curved bending portions, said longitudinal edges of the filter element extending transversely to said folding portions and bending portions, two filter element support elements abutting the longitudinal edges of the filter element and comprising individual interconnected support members, at least one filter element support element formed of adjacent support members having adjacent mutually confronting limiting edges, said support elements supporting said three-dimensional structure of the filter element, the filter element has its longitudinal edges connected to the support members of the filter element support elements, and the at least one filter element support element is arranged to be flexible between its individual support members, wherein the thickness of the at least one support element in regions between the adjacent support members in such that the at least one filter element support element is deformable with an accompanying change of the distance between the adjacent mutually confronting limiting edges of the adjacent support members.

2. The filter according to claim 1, wherein the adjacent mutually confronting limiting edges are arranged opposite each other.

3. The filter according to claim 1, wherein the support members of the at least one support element are triangular or trapezoidal.

4. The filter according to claim 1, wherein said at least one filter element support element is provided With elastically deformable support members arranged to be flexible relative to each other.

5. The filter according to claim 1, wherein the support members are integrally formed with the filter element support elements.

6. The filter according to claim 1, wherein on transverse edges of the filter element extending in the direction of the bending portions, the two filter element support elements are connected to each other by transverse connecting portions forming a filter element support frame.

7. The filter according to claim 6, wherein the transverse edges of the filter element are connected to the transverse connecting portions of the filter element support frame.

8. The filter according to claim 7, wherein the connecting portions comprise a thermoplastic material, and are integrally connected to the filter element support elements.

9. The filter according to claim 1, wherein the filter element support elements are provided with flanges which project outward beyond the longitudinal edges of the filter element support elements.

10. The filter according to claim 9, wherein the filter element comprises a coarsely perforated reticular support structure and at least one non-woven filtering layer arranged thereon.

11. The filter according to claim 10, wherein the filter element support elements comprises a thermoplastic material.

12. The filter according to claim 11, wherein the filter element support elements are injection molded polypropylene.

13. The filter according to claim 12 wherein the connection between the filter element and the filter element support elements and the support members and/or the connection between the filter element and the filter element support frame is effected by surrounding the edge of the filter element with the material forming the filter element support elements or the filter element support frame during injection molding of the filter element support elements or the filter element support frame or both.

14. The filter according to claim 1, wherein the filter element comprises a thermoplastic material.

15. The filter according to claim 1, wherein the longitudinal edges of the filter element are received in receiving grooves formed in the filter element support elements and the support members.

16. The filter according to claim 1, wherein outer side edges of the filter element support elements facing away from each other have a sealing material arranged thereon.

* * * * *